(12) United States Patent
Metz

(10) Patent No.: US 10,053,173 B1
(45) Date of Patent: Aug. 21, 2018

(54) HEIGHT ADJUSTING DEVICE

(71) Applicant: Back Forty Development LLC, Danbury, CT (US)

(72) Inventor: Stephen Byers Metz, Danbury, CT (US)

(73) Assignee: Back Forty Development, LLC, Danbury, CT (US)

( * ) Notice: Subject to any disclaimer, the term of this patent is extended or adjusted under 35 U.S.C. 154(b) by 0 days.

(21) Appl. No.: 15/638,657

(22) Filed: Jun. 30, 2017

(51) Int. Cl.
  *B62J 1/10* (2006.01)
  *B62J 1/08* (2006.01)
  *B62K 19/36* (2006.01)

(52) U.S. Cl.
  CPC . *B62J 1/08* (2013.01); *B62J 1/10* (2013.01); *B62K 19/36* (2013.01); *B62J 2001/085* (2013.01)

(58) Field of Classification Search
  CPC .... A47C 3/20; A47C 3/285; B62J 1/00; B62J 1/06; B62J 1/08; B62K 19/36; B62K 21/24; F16B 7/1427; F16B 7/1463; Y10T 403/32516; Y10T 403/32467; Y10T 403/32501
  See application file for complete search history.

(56) References Cited

U.S. PATENT DOCUMENTS

| 208,823 | A | * | 10/1878 | Jennings | A47C 3/26 108/146 |
| 3,856,252 | A | * | 12/1974 | Regis | F16B 7/14 248/600 |
| 4,807,856 | A | * | 2/1989 | Teckenbrock | B62K 19/36 188/67 |
| 5,779,249 | A | * | 7/1998 | Lin | B62K 19/36 280/287 |
| 5,795,026 | A | * | 8/1998 | Dral | A47C 1/03 297/411.2 |
| 5,829,839 | A | * | 11/1998 | Wilkerson | A47C 1/03 297/411.36 |
| 5,833,414 | A | * | 11/1998 | Feldman | B60P 7/15 410/151 |
| 5,988,963 | A | * | 11/1999 | Shiau | B60P 7/15 410/143 |
| 6,132,001 | A | * | 10/2000 | Su | A47C 1/03 248/161 |
| 6,210,090 | B1 | * | 4/2001 | Wyse | B60P 7/15 410/122 |
| 6,354,557 | B1 | * | 3/2002 | Walsh | B62J 1/08 248/408 |

(Continued)

*Primary Examiner* — Daniel J Wiley
(74) *Attorney, Agent, or Firm* — Harness, Dickey & Pierce, P.L.C.

(57) ABSTRACT

A height adjusting device for a bicycle includes a mounting tube, a seat post, and a ratchet member. The mounting tube is configured to be inserted into a seat tube of the bicycle, and defines therein an inner tube space. The seat post is telescopically received in the inner tubular space through an upper open end of the mounting tube, and has a rack region with a plurality of rack teeth. The ratchet member has a ratchet end which is rotatable about a ratchet axis among a forward position, a normal position, and a rearward position, and which is coupled to a selected one of rack teeth so as to permit said selected one of the rack teeth to be kept engaged relative to the ratchet end.

14 Claims, 19 Drawing Sheets

(56) References Cited

U.S. PATENT DOCUMENTS

| | | | | |
|---|---|---|---|---|
| 6,837,642 B1* | 1/2005 | Lin | ................ | F16B 7/105 |
| | | | | 403/109.1 |
| 7,434,887 B1* | 10/2008 | Hsien | ................ | A47C 1/03 |
| | | | | 297/411.36 |
| 7,708,251 B2* | 5/2010 | Watt | ................ | A63B 22/0046 |
| | | | | 248/407 |
| 8,128,306 B2* | 3/2012 | Gorza | ................ | B62J 1/08 |
| | | | | 248/354.7 |
| 8,317,261 B2 | 11/2012 | Walsh | | |
| 8,490,930 B2* | 7/2013 | Huang | ................ | B60P 7/15 |
| | | | | 248/122.1 |
| 9,707,436 B1* | 7/2017 | Atwood | ................ | A63B 21/157 |
| 2002/0140266 A1* | 10/2002 | Broekhuis | ................ | A47C 3/265 |
| | | | | 297/353 |
| 2004/0204298 A1* | 10/2004 | Chen | ................ | A63B 22/0605 |
| | | | | 482/57 |

\* cited by examiner

HEIGHT ADJUSTING DEVICE

FIELD

The disclosure relates to a height adjusting device, more particularly to a height adjusting device for a bicycle.

BACKGROUND

U.S. Pat. No. 8,317,261 B2 discloses a conventional bicycle seat height adjusting assembly which comprises of a seat post that axially slides into an insert tube that fits into a bicycle frame in the place of a conventional seat post. The front of the insert tube has a plurality of evenly spaced locking holes sized to receive a locking pin. The locking pin with supplemental spring is positioned within the lower section of the seat post. A main air spring is positioned within the seat post to keep the main air spring free from dirt interference, allow the post to fully rise and lower, and enable the use of a maximum height pre-adjustment system. A first longitudinal groove positioned along the inner wall of the insert tube contains a spline rod with wedging projections. The spline rod is connected to a cable that extends out to an actuation lever that is positioned on the handlebars. As the actuation lever is pulled, the wedging projections push the locking pin out of the locking holes where the main air spring causes the seat post to rise. The conventional bicycle seat height adjusting assembly has a relatively complicated configuration.

SUMMARY

Therefore, an object of the disclosure is to provide a novel height adjusting device for a bicycle, which has a relatively simple configuration. With the provision of the height adjusting device, a cyclist may adjust the position of a bicycle seat during the cycling.

According to the disclosure, a height adjusting device for a bicycle including a seat and a bicycle frame is provided. The height adjusting device includes a mounting tube, a seat post, and an adjusting unit. The mounting tube extends along a tube axis in an axial direction, and has an upper open end and a lower end which is configured to be inserted into the seat tube. The seat post is movably engaged relative to the mounting tube, and has a top end, a bottom end, and an intermediate segment. The top end is disposed outwardly of the mounting tube for supporting the seat, and is displaceable between an upper position, where the top end is distal from the mounting tube, and a lower position, where the top end is proximal to the mounting tube relative to the upper position. The bottom end is opposite to the top end in the axial direction. The intermediate segment is disposed between the top and bottom ends and has a plurality of engaged areas separated from each other in the axial direction. The adjusting unit includes a ratchet member having a ratchet end. The ratchet end is rotatable about a ratchet axis between: (i) a forward position; (ii) a normal position; and (iii) a rearward position, and is coupled to a selected one of the engaged areas so as to permit the selected one of the engaged areas to remain engaged relative to the ratchet end, the ratchet end being configured such that: (i) when the ratchet end is in the normal position, the seat post is prevented from movement relative to the mounting tube, (ii) when the ratchet end is moved to the forward position from the normal position, the seat post is permitted to be unidirectionally displaced toward the upper position, and (iii) when the ratchet end is moved to the rearward position from the normal position, the seat post is permitted to be unidirectionally displaced toward the lower position.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
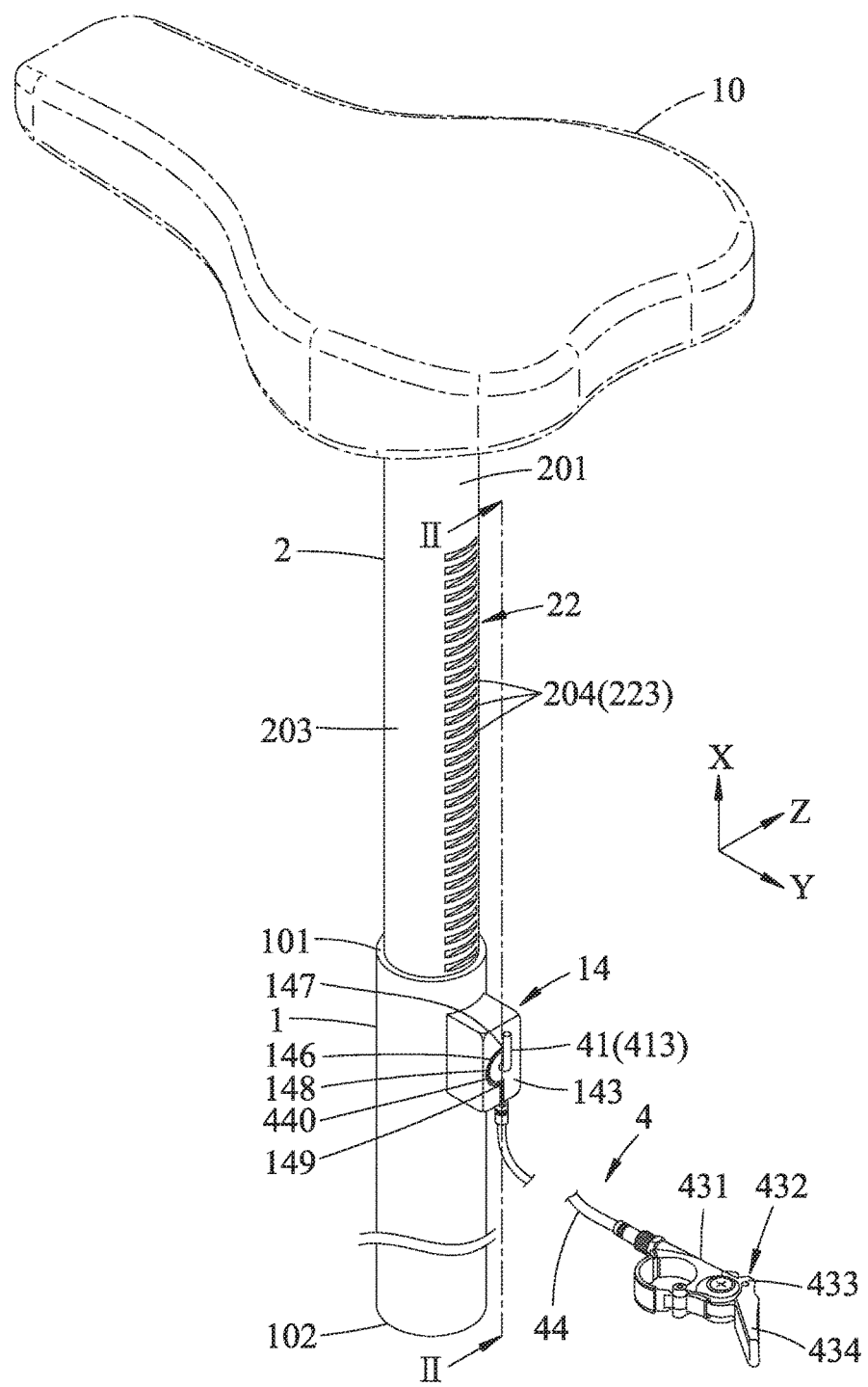
FIG. 1 is a perspective view of a height adjusting device according to a first embodiment of the disclosure.

Before the disclosure is described in greater detail, it should be noted that where considered appropriate, reference numerals have been repeated among the figures to indicate corresponding or analogous elements, which may optionally have similar characteristics.

Figure 2:
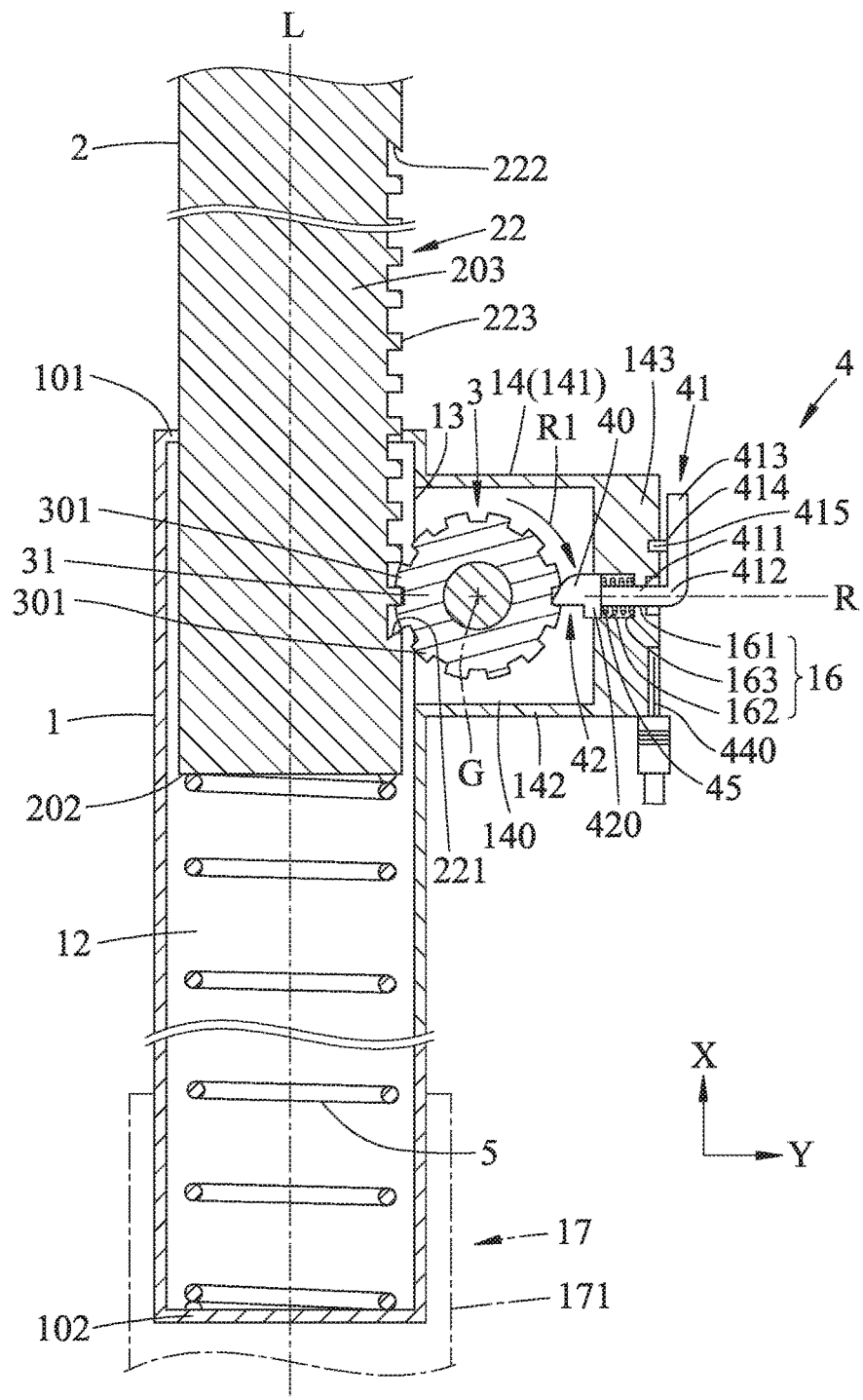
FIG. 2 is a cross-sectional view taken along the line II-II of FIG. 1.

With reference to FIGS. 1 and 2, a height adjusting device for a bicycle is shown to include a mounting tube 1, a seat post 2, and an adjusting unit 4. Generally, the bicycle includes a seat 10 and a bicycle frame 17 having a seat tube 171. The height adjusting device is adapted to be connected between the seat 10 and the bicycle frame 17.

The mounting tube 1 is configured to be mounted to the bicycle frame 17, and extends along a tube axis (L) in an axial direction (X). In this embodiment, the mounting tube 1 defines therein an inner tubular space 12, and has an upper open end 101 and a lower end 102. As shown in FIG. 2, the lower end 102 is configured to be inserted into a seat tube 171 of the bicycle frame 17. Furthermore, the mounting tube 1 has an access opening 13.

The seat post 2 is movably engaged relative to the mounting tube 1, and is configured to support the seat 10. The seat post 2 is movable relative to the mounting tube 1 in the axial direction (X). In addition, the seat post 2 has a top end 201, a bottom end 202, and an intermediate segment 203. In this embodiment, the seat post 2 is telescopically received in the inner tubular space 12 through the upper open end 101 of the mounting tube 1.

The top end 201 is disposed outwardly of the mounting tube 1 for supporting the seat 10, and is displaceable between an upper position (FIGS. 1 and 2), where the top end 201 is distal from the mounting tube 1, and a lower position (FIG. 3), where the top end 201 is proximal to the mounting tube 1 relative to the upper position. The bottom end 202 is opposite to the top end 201 in the axial direction (X). The intermediate segment 203 is disposed between the top and bottom ends 201, 202, and has a plurality of engaged areas 204 separated from each other in the axial direction (X). In this embodiment, the intermediate segment 203 has a rack region 22 which includes a plurality of rack teeth 223 displaced from each other in the axial direction (X) to serve as the engaged areas 204. In addition, the rack region 22 is formed on an outer surface of the seat post 2.

Figure 4:
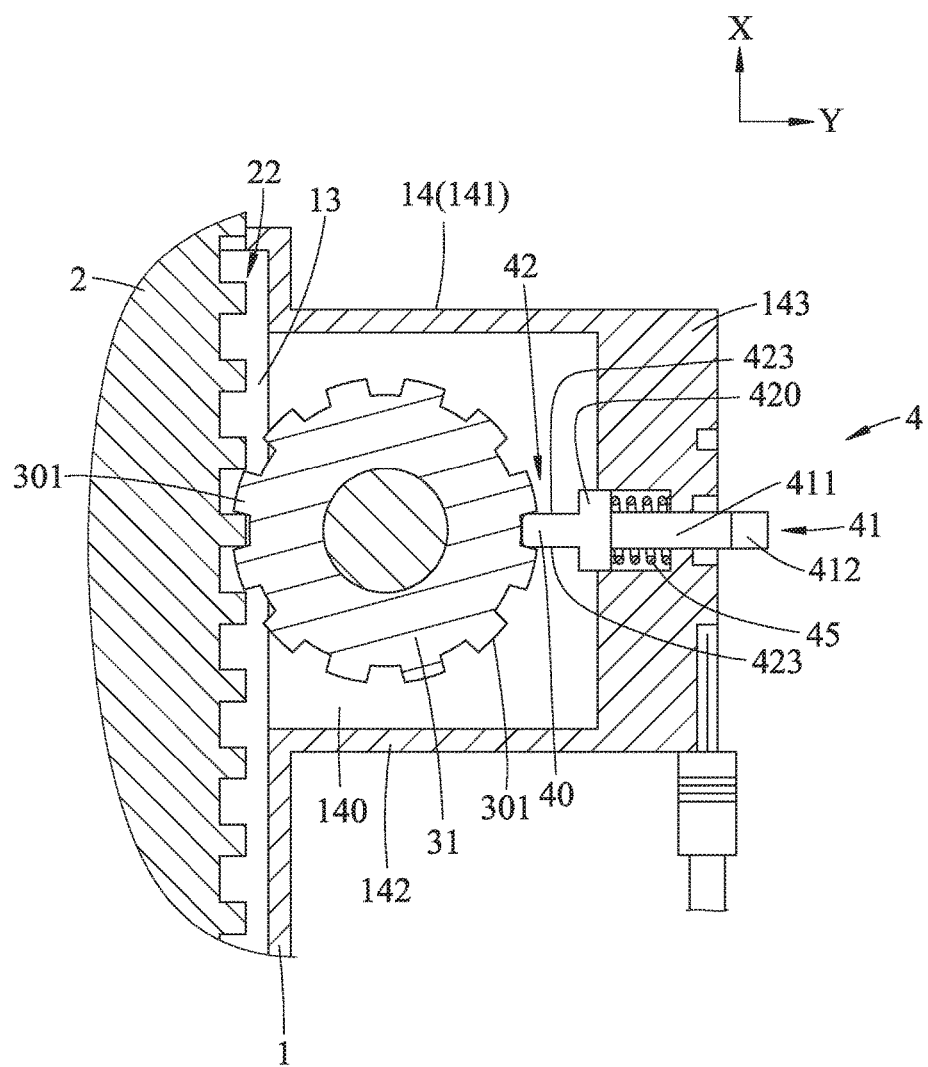
FIG. 4 is an enlarged view of FIG. 2 but illustrating the ratchet end in a normal position.

The adjusting unit 4 is coupled to be kept engaged relative to the rack region 22 and is configured to be rotatable so as to permit the seat post 2 to be converted from a locked state to an unlocked state. In the locked state, as shown in FIG. 4, the rack region 22 is kept unmoved relative to the adjusting unit 4 to thereby prevent movement of the seat post 2 relative to the mounting tube 1. In the unlocked state, as shown in FIGS. 5 and 6, the rack region 22 is permitted to move relative to the adjusting unit 4 to thereby permit the movement of the seat post 2 relative to the mounting tube 1.

Figure 3:
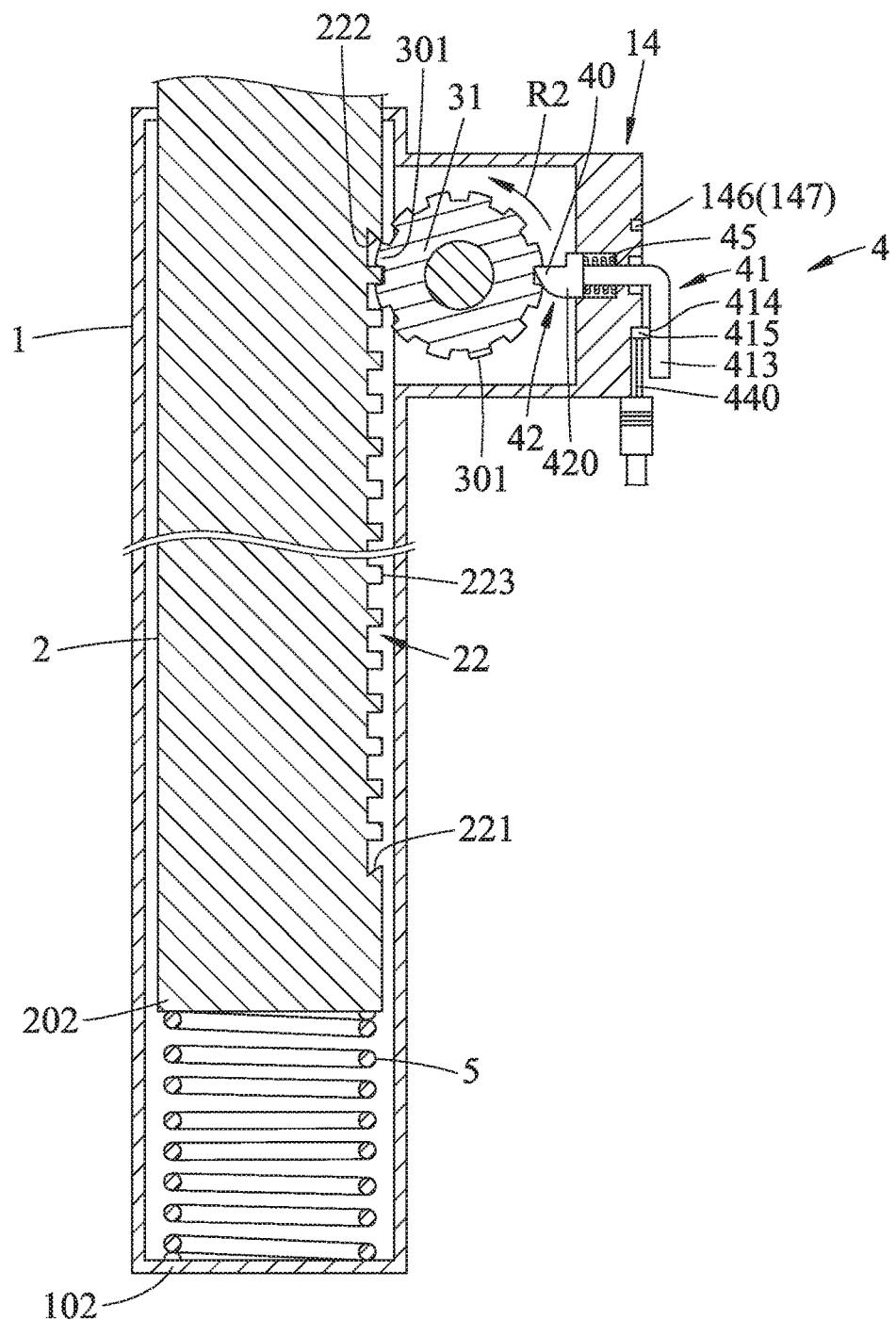
FIG. 3 is similar to FIG. 2 but illustrating a ratchet end of a ratchet member in a rearward position.
Figure 5:
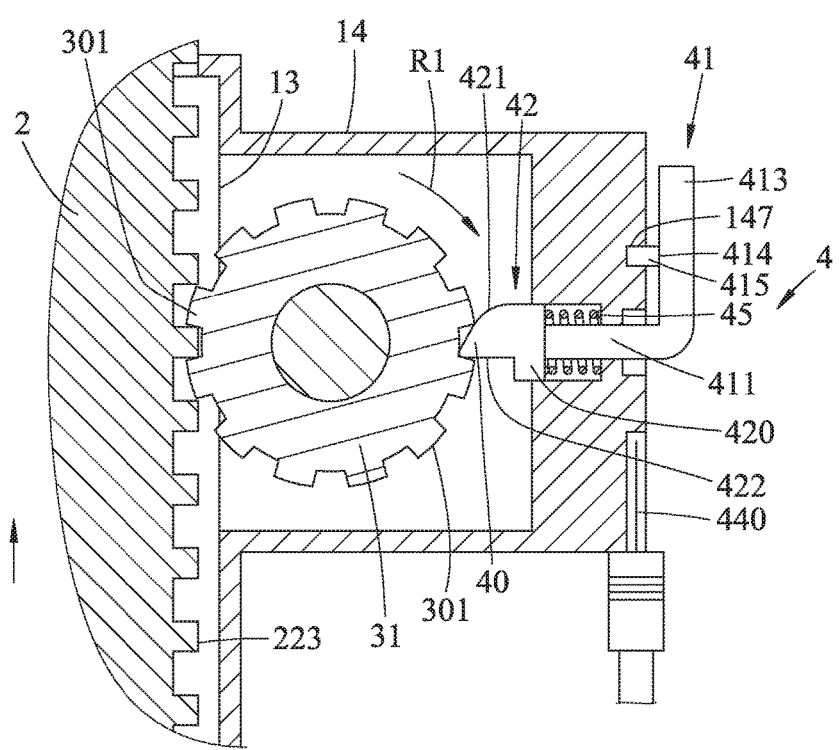
FIG. 5 is similar to FIG. 4 but illustrating the ratchet end in a forward position.
Figure 6:
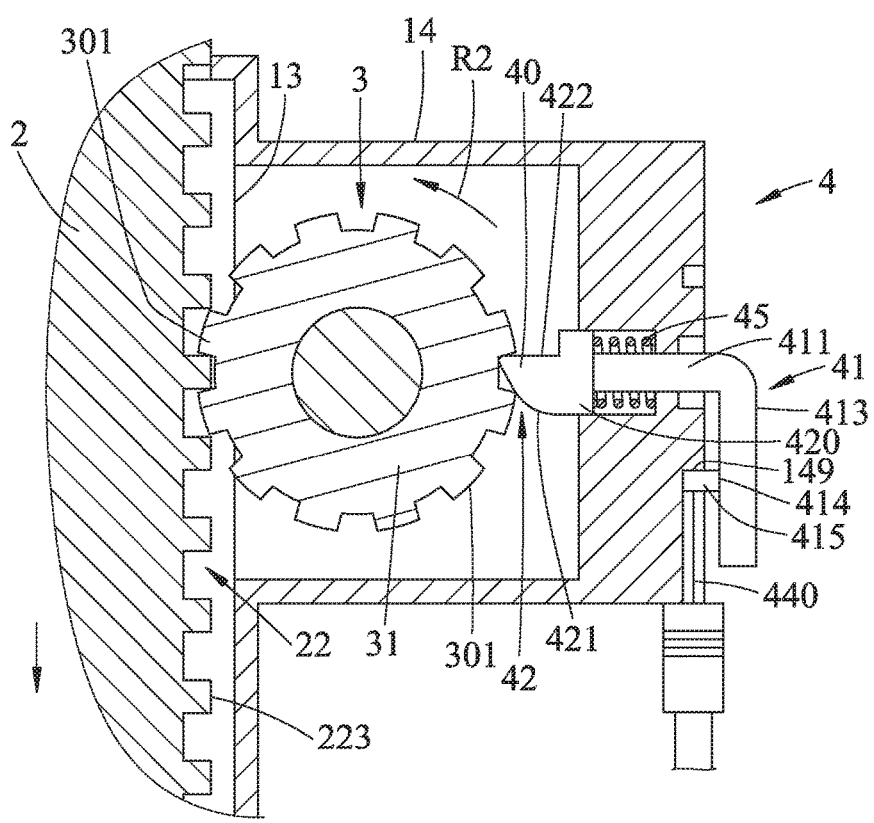
FIG. 6 is similar to FIG. 4 but illustrating the ratchet end in the rearward position.

As shown in FIG. 2, the adjusting unit 4 includes a ratchet member 42 having a ratchet end 40 which is rotatable about a ratchet axis (R) in a radial direction (Y) relative to the axial direction (X) among a forward position (FIGS. 2 and 5), a normal position (FIG. 4), and a rearward position (FIGS. 3 and 6). In addition, the ratchet end 40 is coupled to a selected one of the engaged areas 204 (i.e., a selected one of the rack teeth 223) so as to permit said selected one of the rack teeth 223 to remain engaged relative to the ratchet end 40. When the ratchet end 40 is in the normal position (FIG. 4), the seat post 2 is in the locked state and is prevented from movement relative to the mounting tube 1. When the ratchet end 40 is moved to the forward position (FIGS. 2 and 5) from the normal position, the seat post 2 is converted to the unlocked state and is permitted to unidirectionally move toward the upper position. When the ratchet end 40 is moved to the rearward position (FIGS. 3 and 6) from the normal position, the seat post 2 is converted to the unlocked state and is permitted to unidirectionally move toward the lower position.

Referring to FIGS. 4 to 6, it can be seen that the ratchet end 40 has a cam surface 421, an opposing abutment surface 422, and two flank abutment surfaces 423. The opposing abutment surface 422 is configured to extend to join the cam surface 421 at a front edge of the ratchet end 40. The two flank abutment surfaces 423 are disposed to flank the cam surface 421 and the opposing abutment surface 422.

In addition, the ratchet member 42 further has an inserted end 420 opposite to the ratchet end 40 in the radial direction (Y).

In this embodiment, as shown in FIG. 2, the height adjusting device further includes a biasing member 5 and a gear unit 3.

The biasing member 5 is disposed between the lower end 102 of the mounting tube 1 and the bottom end 202 of the seat post 2 so as to bias the top end 201 of the seat post 2 to move to the upper position.

The gear unit 3 is disposed to couple the ratchet end 40 to said selected one of the rack teeth 223 so as to permit said selected one of the rack teeth 223 to be kept engaged with the gear unit 3.

Moreover, the adjusting unit 4 further includes a biasing unit 45 disposed to bias the ratchet end 40 to be in frictional engagement with the gear unit 3 so as to keep said selected one of the rack teeth 223 to be in frictional engagement with the gear unit 3.

The gear unit 3 includes a pinion gear 31 which is rotatably meshed with the racket teeth 223 about a gear axis (G) in a transverse direction (Z) relative to the axial direction (X) (see FIGS. 1 and 2). The pinion gear 31 has a plurality of gear teeth 301 displaced from each other about the gear axis (G).

As best shown in FIG. 5, when the ratchet end 40 is in the forward position, the gear teeth 301 are permitted to pass the cam surface 421, which is oriented to face upward, against a biasing force of the biasing unit 45 to allow a clockwise rotation of the pinion gear 31 as shown by an arrow (R1), thereby allowing an upward movement of the seat post 2. The opposing abutment surface 422 is disposed to be brought into frictional engagement with one of the gear teeth 301 thereby preventing a counterclockwise rotation of the pinion gear 31.

As best shown in FIG. 6, when the ratchet end 40 is in the rearward position, the gear teeth 301 are permitted to past the cam surface 421, which is oriented to face downward, against the biasing force of the biasing unit 45 to allow a counterclockwise rotation of the pinion gear 31 as shown by an arrow (R2), thereby allowing a downward movement of the seat post 2. The opposing abutment surface 422 is disposed to be brought into frictional engagement with one of the gear teeth 301 thereby preventing a clockwise rotation of the pinion gear 31.

As shown in FIG. 4, when the ratchet end 40 is in the normal position, the flank abutment surfaces 423 are brought into frictional engagement with one of the gear teeth 301 to prevent rotation of the pinion gear 31 thereby preventing the movement of the seat post 2.

In this embodiment, the transverse direction (Z) is transverse to both the axial direction (X) and the radial direction (Y).

Moreover, as shown in FIGS. 2 and 3, the seat post 2 further has a lower barrier surface 221 and an upper barrier surface 222.

The lower barrier surface 221 is spaced apart from a lowermost one of the rack teeth 223 in the axial direction (X), and is configured such that once the pinion gear 31 of the gear unit 3 is forced to slip over the lowermost one of the rack teeth 223 in response to the upward movement of the seat post 2, the lower barrier surface 221 is not permitted to be brought into frictional engagement with the pinion gear 31, thereby terminating the upward movement of the seat post 2 (see FIG. 2).

The upper barrier surface 222 is spaced apart from an uppermost one of the rack teeth 223 in the axial direction (X), and is configured such that once the pinion gear 31 of the gear unit 3 is forced to slip over the uppermost one of the rack teeth 223 in response to the downward movement of the seat post 2, the upper barrier surface 222 is not permitted to be brought into frictional engagement with the pinion gear 31, thereby terminating the downward movement of the seat post 2 (see FIG. 3).

In this embodiment, as shown in FIG. 2, the height adjusting device further includes a casing 14 mounted on the mounting tube 1. The casing 14 defines therein a chamber 140 in which the pinion gear 31 is rotatably mounted. The chamber 140 extends toward the mounting tube 1 to be in spatial communication with the access opening 13 to permit access of the pinion gear 31 to the rack region 22. The chamber 140 further extends away from the mounting tube 1 to terminate at a mounting wall 143. The mounting wall 143 has a through hole 16 which extends along the ratchet axis (R), and which has a smaller-dimension hole segment 161, a larger-dimension hole segment 162, and a shoulder surface 163. The larger-dimension hole segment 162 is configured to permit insertion of the inserted end 420 of the ratchet member 42. The shoulder surface 163 is disposed between the smaller-dimension and larger-dimension hole segments 161, 162. The biasing unit 45 is disposed between the shoulder surface 163 and the inserted end 420 of the ratchet member 42 to bias the ratchet end 40 into frictional engagement with the pinion gear 31.

In addition, the casing 14 further has an upper wall 141 and a lower wall 142 which border the chamber 140.

Furthermore, as shown in FIGS. 1 and 2, the adjusting unit 4 further includes a crank member 41, a key 415, a keyway 146, a lever mount 431, an actuating lever 432, a cable housing 44, and a force-transmitting cable 440.

The crank member 41 has a shaft segment 411 and an arm segment 413.

The shaft segment 411 extends from the inserted end 420 of the ratchet member 42 through the smaller-dimension hole segment 161 to terminate at a connected end 412 disposed outwardly of the mounting wall 143. In addition, the shaft segment 411 is rotatably mounted in the smaller-dimension hole segment 161.

The arm segment 413 extends radially from the connected end 412 relative to the ratchet axis (R) and has an actuated region 414 which is angularly displaceable about the ratchet axis (R) among an upward position (FIGS. 1, 2 and 5), where the ratchet end 40 is in the forward position, a mid position (FIG. 4), where the ratchet end 40 is in the normal position, and a downward position (FIGS. 3 and 6), where the ratchet end 40 is in the rearward position. In this embodiment, the actuated region 414 is disposed to confront the casing 14.

The keyway 146 is formed on an outer surface of the mounting wall 143 of the casing 14, and has a distal point 147, a middle point 148, and a proximate point 149. The key 415 extends from the actuated region 414 of the crank member 41 into the keyway 146. When the actuated region 414 is in the upward position, the key 415 is in the distal point 147 of the keyway 146 (see FIGS. 1 and 5). When the actuated region 414 is in the mid position, the key 415 is in the middle point 148 of the keyway 146. When the actuated region 414 is in the downward position, the key 415 is in the proximate point 149 of the keyway 146 (see FIGS. 1 and 6).

The lever mount 431, which is only shown in FIG. 1, is adapted to be mounted on the bicycle frame 17, such as a handlebar (not shown).

The actuating lever 432 is coupled to the actuated region 414 of the arm segment 413 of the crank member 41 so as to actuate the actuated region 414 to move among the upward position, the mid position, and the downward position. As shown in FIG. 1, the actuating lever 432 has a pivot end 433 and an actuating end 434.

The pivot end 433 is pivotally mounted on the bicycle frame 17 through the lever mount 431.

The actuating end 434 is angularly movable among a locked position, where the actuated region 414 is in the mid position, a rightward position, where the actuated region 414 is in the upward position, and a leftward position, where the actuated region 414 is in the downward position.

The force-transmitting cable 440 is disposed to couple the pivot end 433 of the actuating lever 432 to the actuated region 414 of the arm segment 413 of the crank member 41. In this embodiment, the force-transmitting cable 440 is movable in the cable housing 44 for transmitting force from the actuating lever 432, and has two end segments disposed outwardly of the cable housing 44. One of the two end segments of the force-transmitting cable 440 is coupled to the key 415 and is movable in the keyway 146. The other of the two end segments of the force-transmitting cable 440 is coupled to the pivot end 433 of the actuating lever 432.

When the actuating end 434 is in the locked position, the key 415 is in a middle point 148 of the keyway 146.

When the actuating end 434 is displaced to the rightward position from the locked position, the force-transmitting cable 440 is pushed to force the key 415 to displace to the distal point 147 from the middle point 148.

When the actuating end 434 is displaced to the leftward position from the locked position, the force-transmitting cable 440 is pulled to draw the key 415 to displace to the proximate point 149 from the middle point 148.

Figure 7:
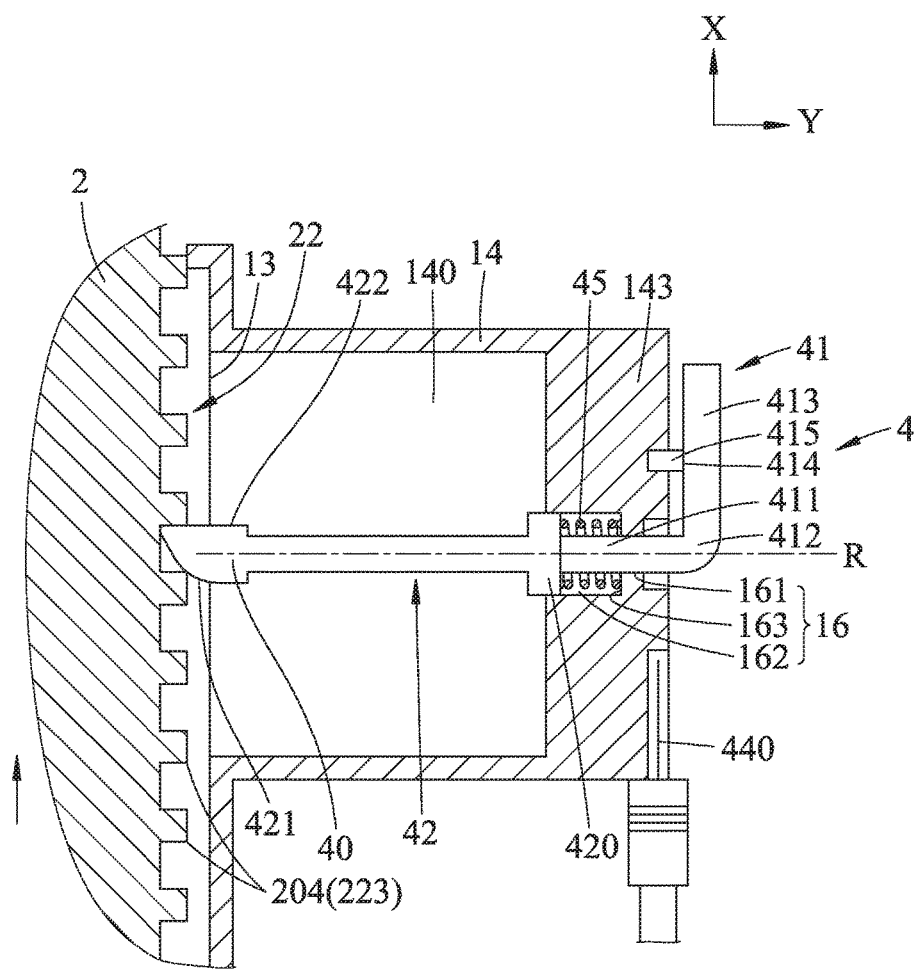
FIG. 7 is a cross-sectional view of a height adjusting device according to a second embodiment of the disclosure.
Figure 8:
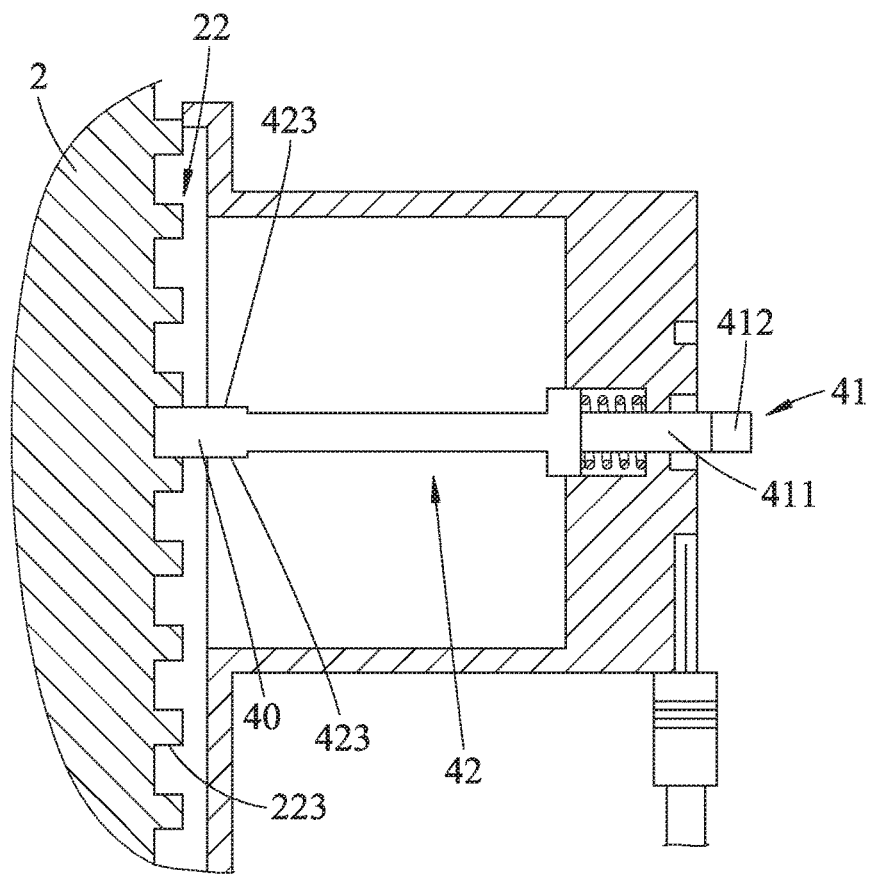
FIG. 8 is similar to FIG. 7 but illustrating a ratchet end of a ratchet member in a normal position.
Figure 9:
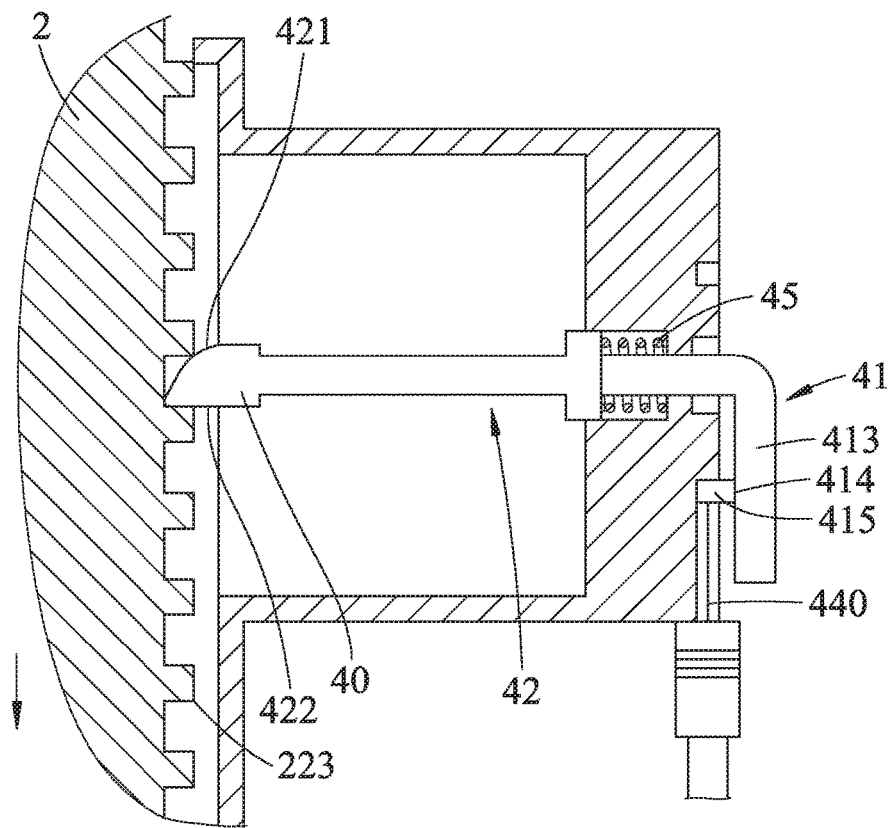
FIG. 9 is similar to FIG. 7 but illustrating the ratchet end in a rearward position.

FIGS. 7 to 9 illustrate a height adjusting device according to a second embodiment of the disclosure. The second embodiment is similar to the first embodiment except that in the second embodiment, the gear unit 3 is not included and the access opening 13 is disposed to permit access of the ratchet end 40 to the rack region 22. In addition, the biasing unit 45 is disposed to force the ratchet end 40 to be in frictional engagement with the rack region 22.

As shown in FIG. 7, when the ratchet end 40 is in the forward position, the rack teeth 223 are permitted to pass the cam surface 421, which is oriented to face downward, against a biasing force of the biasing unit 45, thereby allowing an upward movement of the seat post 2. The opposing abutment surface 422 is disposed to be brought into frictional engagement with one of the rack teeth 223 thereby preventing a downward movement of the seat post 2.

As shown in FIG. 8, when the ratchet end 40 is in the normal position, the flank abutment surfaces 423 are brought into frictional engagement with said selected one of the rack teeth 223 thereby preventing the movement of the seat post 2.

As shown in FIG. 9, when the ratchet end 40 is in the rearward position, the rack teeth 223 are permitted to pass the cam surface 421, which is oriented to face upward, against the biasing force of the biasing unit 45 thereby allowing the downward movement of the seat post 2. The opposing abutment surface 422 is disposed to be brought into frictional engagement with one of the rack teeth 223 thereby preventing the upward movement of the seat post 2.

FIGS. 10 to 13 illustrate a height adjusting device according to a third embodiment of the disclosure. The third embodiment is similar to the first embodiment except that in the third embodiment, the casing 14, the crank member 41, the key 415, the keyway 146, the lever mount 431, the actuating lever 432, the cable housing 44, and the force-transmitting cable 440 are not included.

In the third embodiment, the height adjusting device further includes a mounting shaft 32 which is mounted diametrically in the mounting tube 1, and which extends outwardly of the mounting tube 1 to terminate at amounting end 321. The mounting shaft 32 defines both the ratchet axis (R) and the gear axis (G), and is unmovable relative to the mounting tube 1.

Figure 10:
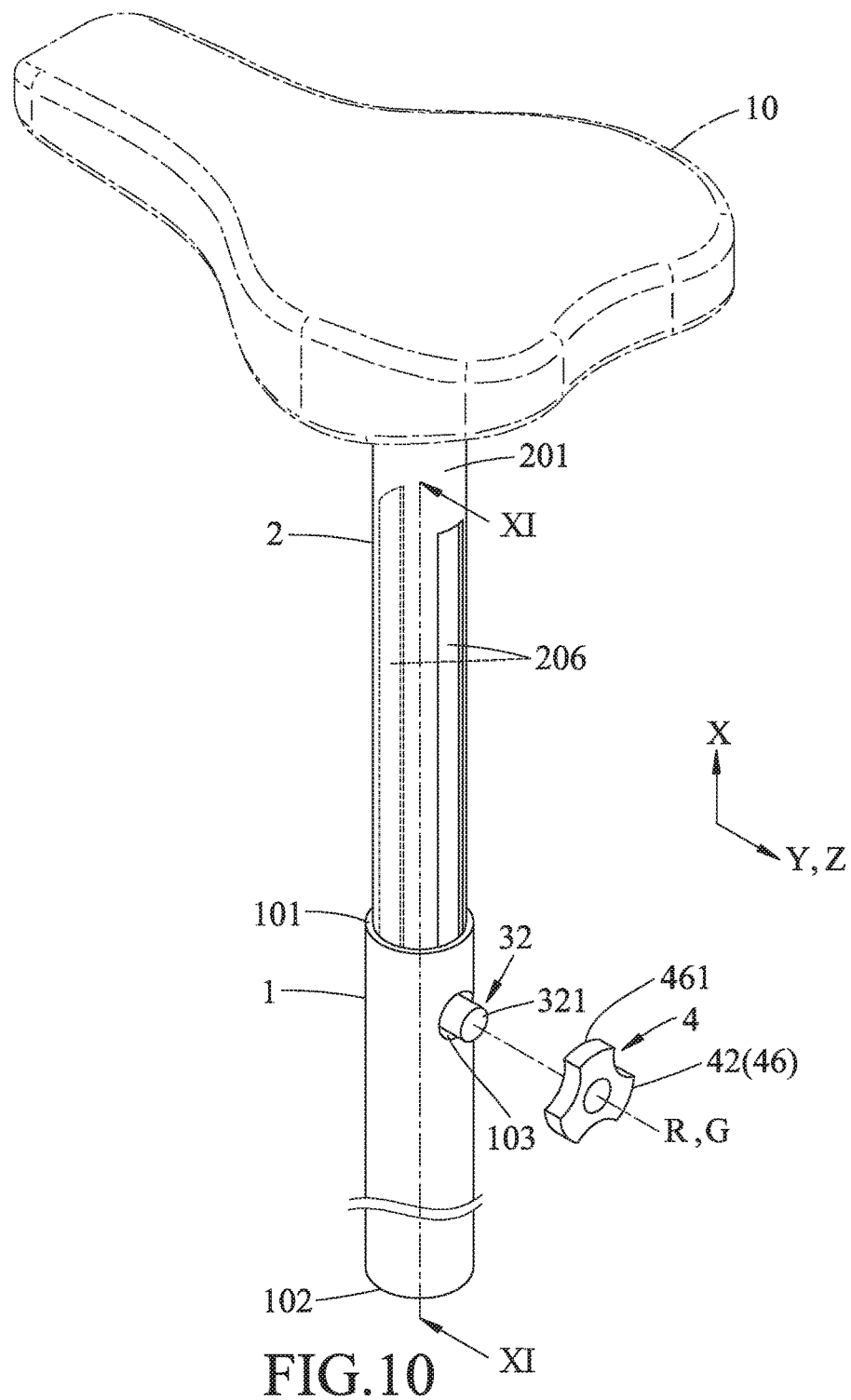
FIG. 10 is a partially exploded perspective view of a height adjusting device according to a third embodiment of the disclosure.

As shown in FIG. 10, the mounting tube 1 has an annular slot 103 disposed to surround the mounting shaft 32 proximate to the mounting end 321.

Figure 11:
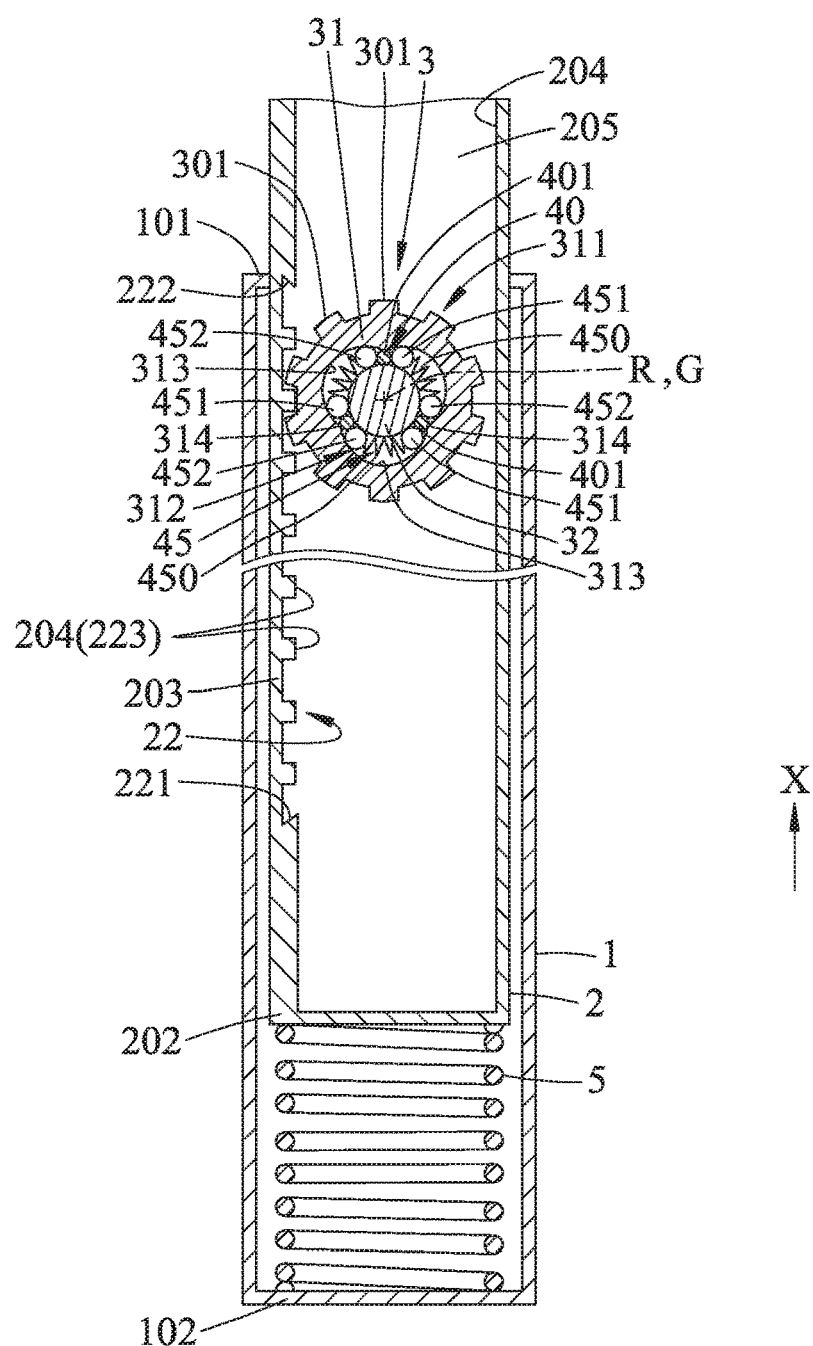
FIG. 11 is a cross-sectional view taken along the line XI-XI of FIG. 10.

Referring to FIG. 11, it can be seen that the seat post 2 is in the form of tubular and has an inner peripheral surface 204 which defines an inner space 205 to accommodate the pinion gear 31, and which has the rack region 22. The seat post 2 has two slots 206 (FIG. 10) which are diametrically opposite to each other to permit the mounting shaft 32 to extend into the inner space 205 and to pass through the two slots 206, and which are configured to extend in the axial direction (X) to permit the mounting shaft 32 to guide movement of the seat post 2.

The pinion gear 31 is disposed in the inner space 205 of the seat post 2, and is rotatably mounted on the mounting shaft 32 about the gear axis (G) in the transverse direction (Z). In this embodiment, the transverse direction (Z) is the radial direction (Y). The pinion gear 31 is in the form of ring, and has an outer rim surface 311 and an inner rim surface 312 opposite to the outer rim surface 311 to confront the mounting shaft 32.

The outer rim surface 311 is formed with a plurality of gear teeth 301 which are displaced from each other about the gear axis (G), and which are configured to mesh with the rack teeth 223. The inner rim surface 312 has a plurality of arcuate-recessed regions 313 displaced from each other about the gear axis (G), and a plurality of ridge areas 314 alternating with the arcuate-recessed regions 313.

In the third embodiment, the adjusting unit 4 further includes a plurality of pairs of first and second friction rollers 451, 452. Each pair of the first and second frictional rollers 451, 452 are rollable on a corresponding one of the arcuate-recessed regions 313.

The biasing unit 45 includes a plurality of biasing subunits 450. Each of the biasing subunits 450 is disposed to bias a corresponding pair of the first and second friction rollers 451, 452 to move toward two corresponding ones of the ridge areas 314.

Furthermore, as shown in FIGS. 10 and 11, the ratchet member 42 has an actuating knob 46 and the ratchet end 40.

The actuating knob 46 is rotatably mounted on the mounting end 321 of the mounting shaft 32 to rotate the ratchet end 40 from the normal position to one of the forward and rearward positions. The actuating knob 46 has a tube-side surface 461.

The ratchet end 40 includes a plurality of pins 401 displaced from each other about the ratchet axis (R). Each of the pins 401 extends from the tube-side surface 461 of the actuating knob 46 through the annular slot 103 into the pinion gear 31 and between the mounting shaft 32 and the inner rim surface 312.

In this embodiment, the ratchet end 40 includes three pins 401 and the adjusting unit 4 includes three pairs of the first and second friction rollers 451, 452. In the other embodiments, the number of the pins 401 and the pairs of the first and second friction rollers 451, 452 may be varied.

As shown in FIG. 11, when the pins 401 are in the normal position, each of the pins 401 is disposed between the mounting shaft 32 and a corresponding one of the ridge areas 314 so as to be squeezed between two adjacent ones of the first and second friction rollers 451, 452.

Figure 12:
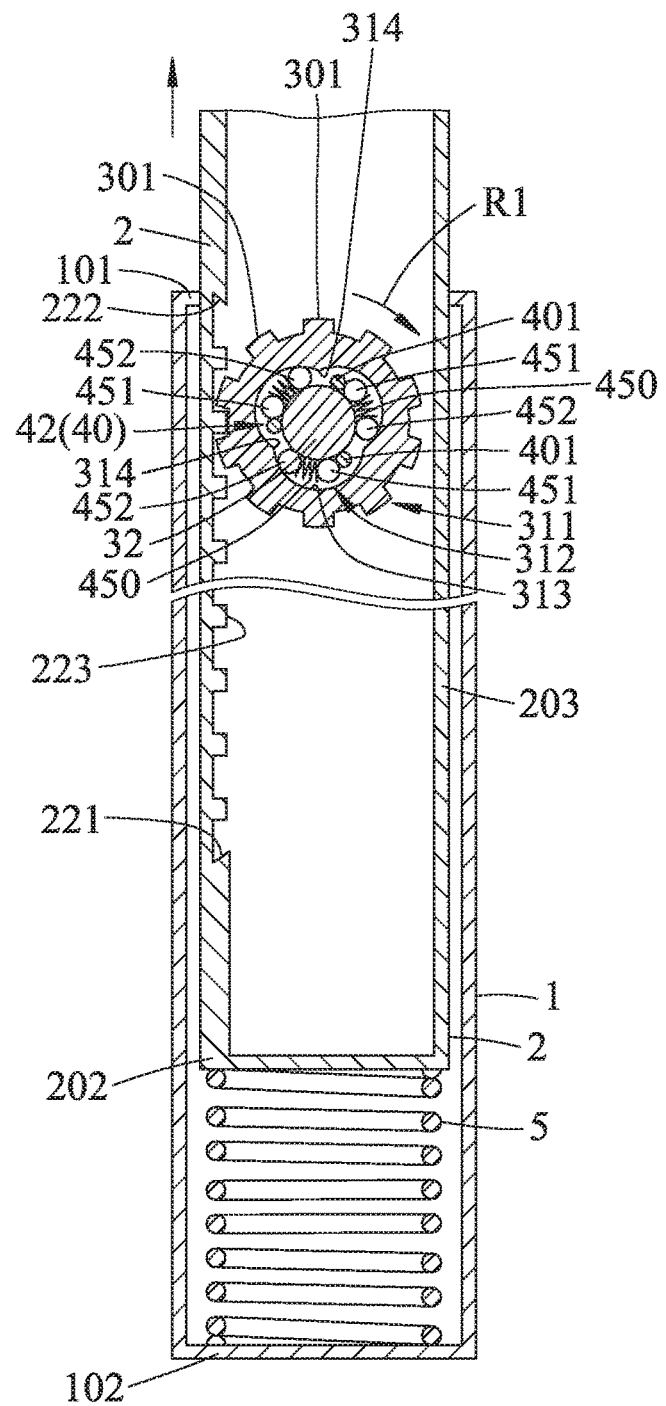
FIG. 12 is similar to FIG. 11 but illustrating a ratchet end of a ratchet member in a forward position.

As shown in FIG. 12, in response to a clockwise turning of the pins 401 from the normal position to the forward position, the first friction rollers 451 are respectively moved away from the ridge areas 314 against a biasing force of the biasing subunits 450 to permit the pinion gear 31 to rotate in a clockwise direction (R1), thereby allowing movement of the top end 201 of the seat post 2 toward the upper position.

Figure 13:
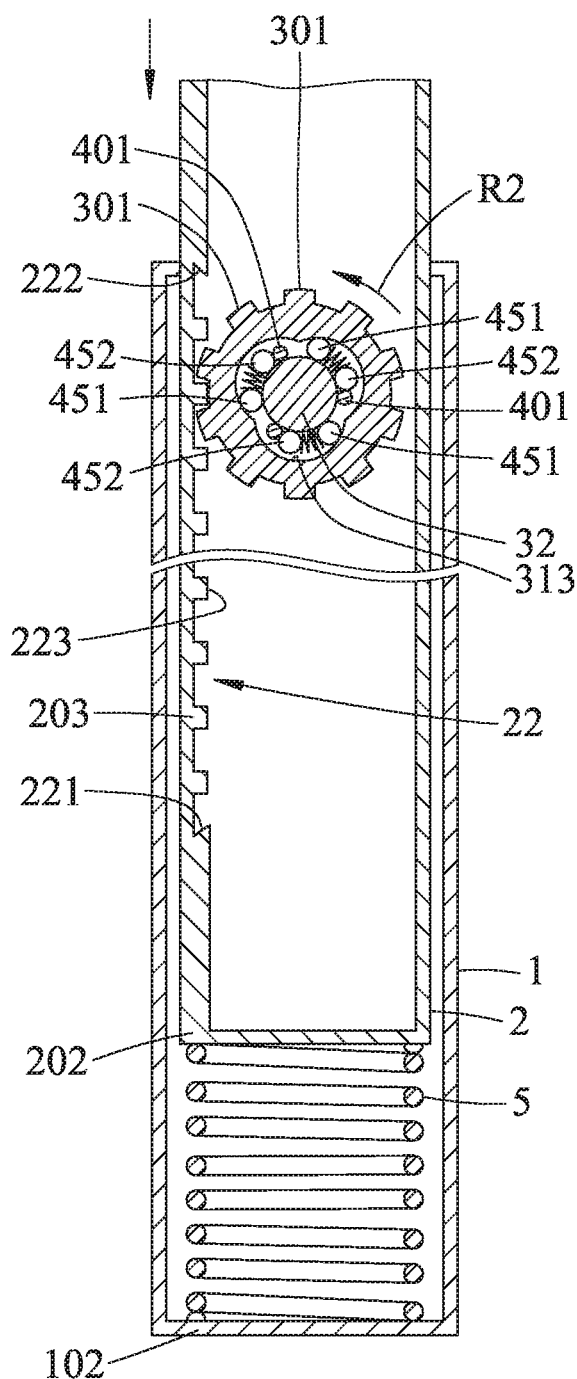
FIG. 13 is similar to FIG. 11 but illustrating the ratchet end in a rearward position.
Figure 14:
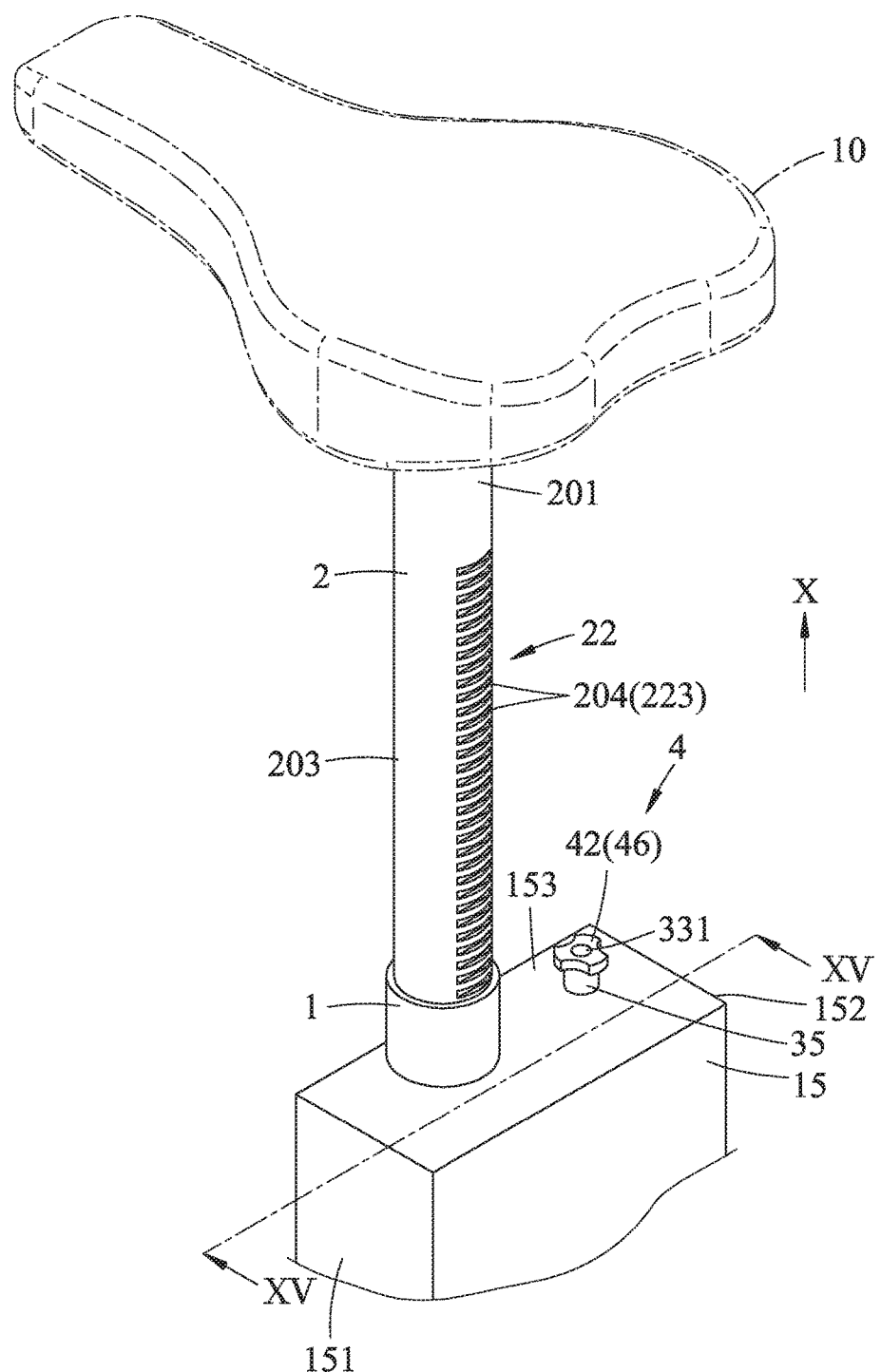
FIG. 14 is a perspective view of a height adjusting device according to a fourth embodiment of the disclosure.

As shown in FIG. 13, in response to a counterclockwise turning of the pins 401 from the normal position to the rearward position, the second friction rollers 452 are respectively moved away from the ridge areas 314 against the biasing force of the biasing subunits 450 to permit the pinion gear 31 to rotate in a counterclockwise direction (R2), thereby allowing movement of the top end 201 of the seat post 2 toward the lower position.

FIGS. 14 to 19 illustrate a height adjusting device according to a fourth embodiment of the disclosure. The fourth embodiment is similar to the third embodiment except that in the fourth embodiment, the rack region 22 is formed on the outer surface of the seat post 2, the mounting tube 1 has an access opening 13, and the mounting shaft 32 is not included.

In the fourth embodiment, the height adjusting device further includes a casing 15 and a mounting shaft 33.

The casing 15 extends in the axial direction (X) to terminate at upper and lower end walls 153, 154 which defines therebetween a casing space 150 to accommodate the gear unit 3. The casing 15 has a through opening 156 which extends between the upper and lower end walls 153, 154, and which is configured to permit the mounting tube 1 to be fitted in the through opening 156. The casing 15 has two sidewalls 151, 152 which border the casing space 150.

The mounting shaft 33 is disposed in the casing space 150 to be spaced apart from the mounting tube 1, and extends along a shaft axis (S) in the axial direction (X) from the lower end wall 154 through the upper end wall 153 to form a mounting end segment 331 disposed outwardly of the upper end wall 153. The mounting shaft 33 is unmovable relative to the mounting tube 1.

The adjusting unit 4 further includes a rotary ring member 35 which is configured to couple to rotate with the gear unit 3, and which is mounted rotatably on the mounting end segment 331 about the shaft axis (S). The rotary ring member 35 has an outer rim surface 351 and an inner rim surface 352 (see FIG. 17). The inner rim surface 352 is opposite to the outer rim surface 351 to confront the mounting shaft 33, and has a plurality of arcuate-recessed regions 353 displaced from each other about the shaft axis (S), and a plurality of ridge areas 354 alternating with the arcuate-recessed regions 353.

In this embodiment, each pair of the first and second frictional rollers 451, 452 are rollable on a corresponding one of the arcuate-recessed regions 353. Each of the biasing subunits 450 is disposed to bias a corresponding pair of the first and second friction rollers 451, 452 to move toward two corresponding ones of the ridge areas 354.

Furthermore, the gear unit 3 is disposed in the casing space 150 to couple the rotary ring member 35 to said selected one of the rack teeth 223, and includes an input gear 34, a first miter gear (output gear) 36, and a second miter gear 37.

Figure 15:
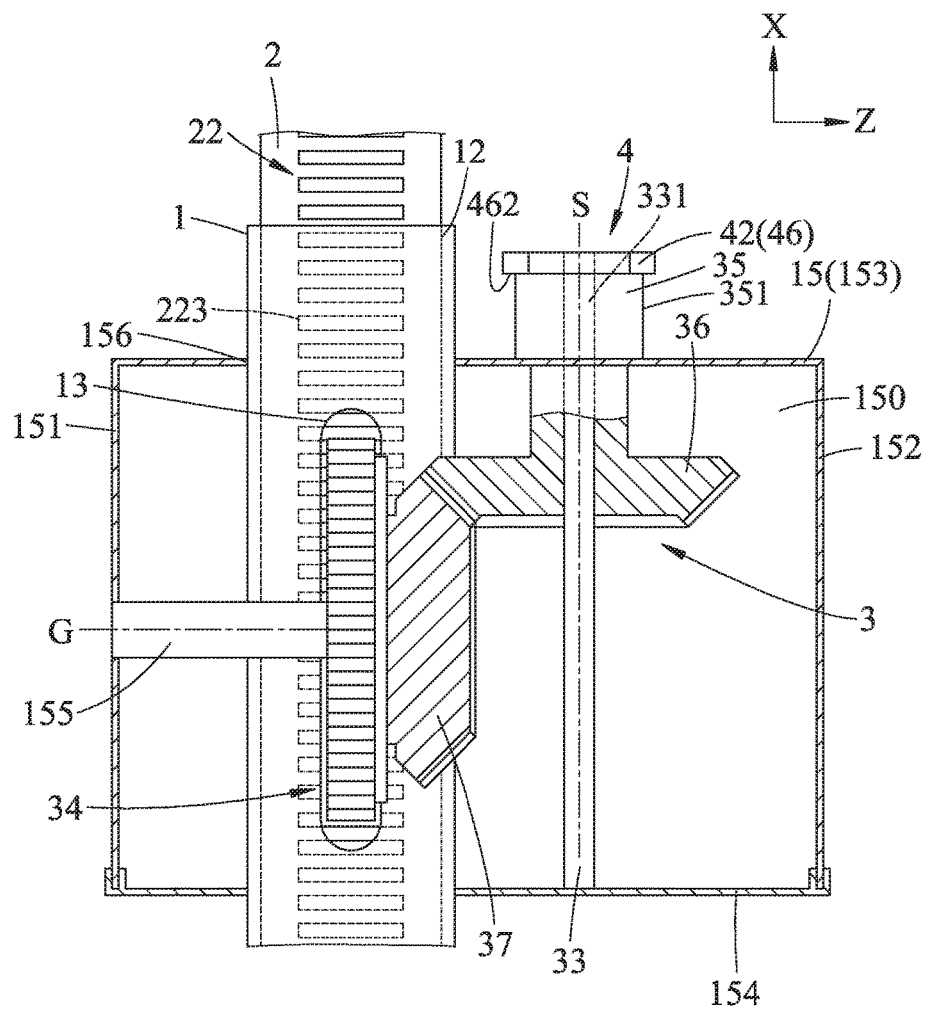
FIG. 15 is a cross-sectional view taken along the line XV-XV of FIG. 14.

As shown in FIG. 15, the input gear 34 is disposed to access to the racket teeth 223 through the access opening 13, and is rotatably meshed with the racket teeth 223 about a gear axis (G) in a transverse direction (Z) relative to the axial direction (X). A gear shaft 155 extending from the sidewall 151 in the transverse direction (Z) defines the gear axis (G), and the input gear 34 is rotatably mounted on the gear shaft 155.

The first miter gear 36 is rotatably mounted on the mounting shaft 33 and is coupled to permit the rotary ring member 35 to rotate therewith.

The second miter gear 37 is rotatably mounted on the gear shaft 155 and is coupled to rotate with the input gear 34. In addition, the second miter gear 37 is configured to mesh with the first miter gear 36 so as to drive the first miter gear 36 to rotate about the shaft axis (S).

As shown in FIG. 15, in this embodiment, the actuating knob 46 is disposed upwardly of the rotary ring member 35, and is rotatably mounted on the mounting end segment 331 of the mounting shaft 33 to rotate the ratchet end 40 from the normal position to one of the forward and rearward positions. The actuating knob 46 has a casing-side surface 462.

Moreover, the ratchet end 40 has a plurality of pins 401 displaced from each other about the shaft axis (S). Each of the pins 401 extends from the casing-side surface 462 of the actuating knob 46 into the rotary ring member 35 and between the mounting shaft 33 and the inner rim surface 352.

Figure 17:
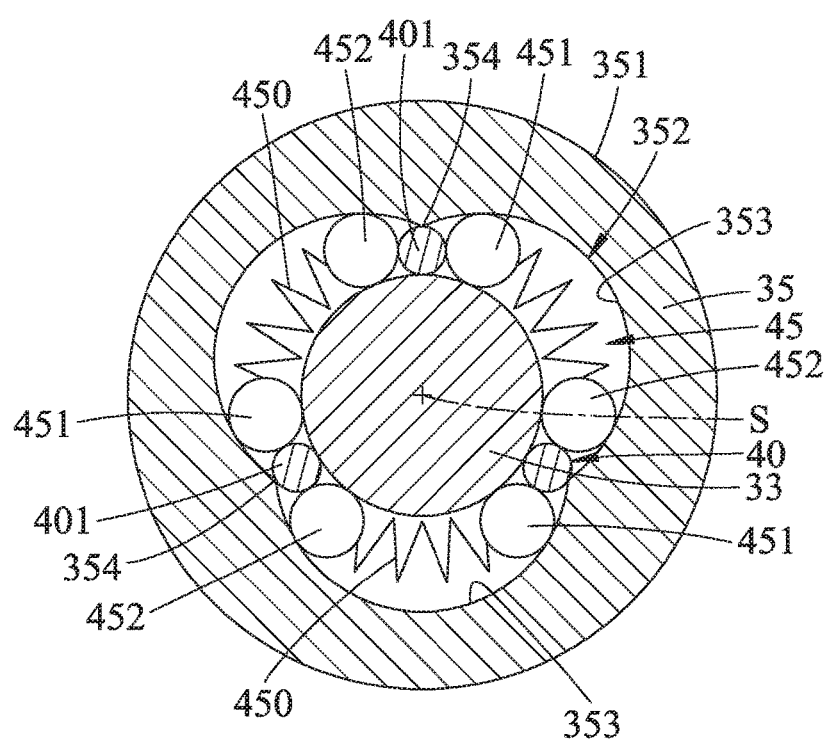
FIG. 17 is a cross-sectional view taken along the line XVII-XVII of FIG. 16.

As shown in FIG. 17, when the pins 401 are in the normal position, each of the pins 401 is disposed between the mounting shaft 33 and a corresponding one of the ridge areas 354 so as to be squeezed between two adjacent ones of the first and second friction rollers 451, 452.

Figure 16:
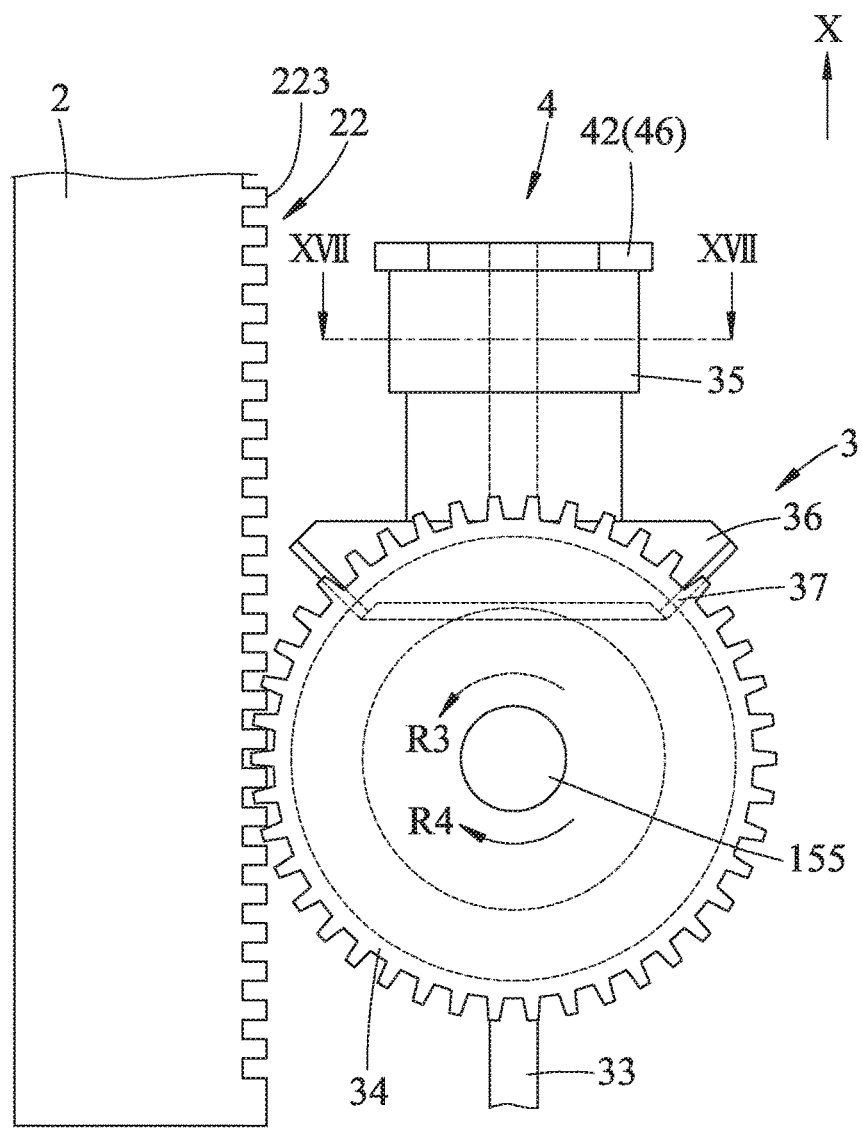
FIG. 16 is a schematic view illustrating a gear unit of the height adjusting device.
Figure 19:
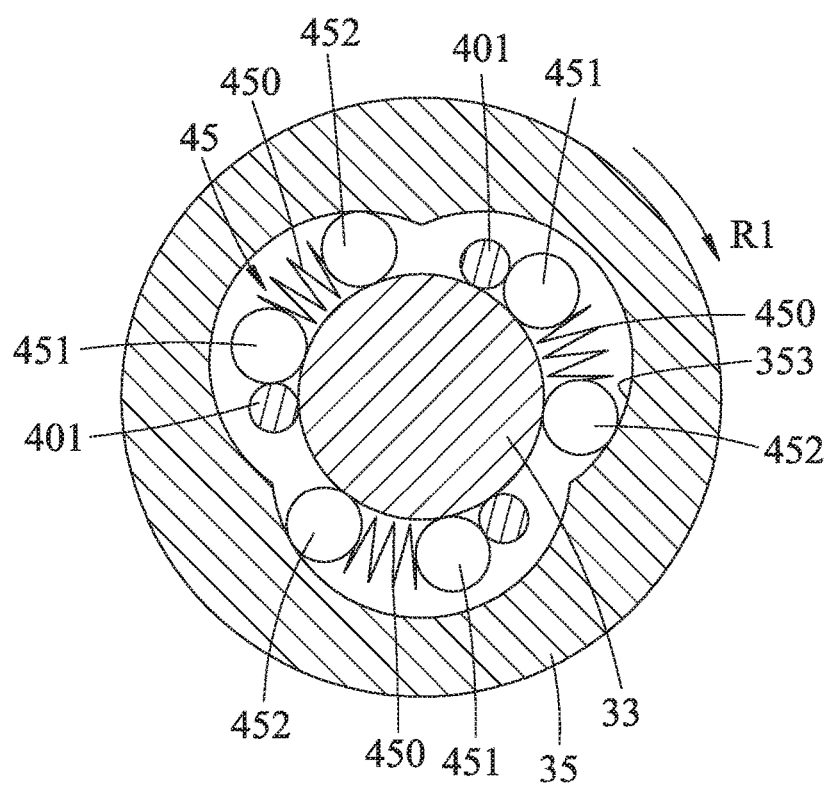
FIG. 19 is similar to FIG. 17 but illustrating the ratchet end in a rearward position.

As shown in FIG. 19, in response to a clockwise turning of the pins 401 from the normal position to the rearward position, the first friction rollers 451 are respectively moved away from the ridge areas 354 against a biasing force of the biasing subunits 450 to permit the rotary ring member 35 to rotate in a clockwise direction (R1). In this case, as shown in FIG. 16, the input gear 35 is permitted to rotate only in a counterclockwise direction (R3) to thereby allow the movement of the top end 201 of the seat post 2 toward the lower position.

Figure 18:
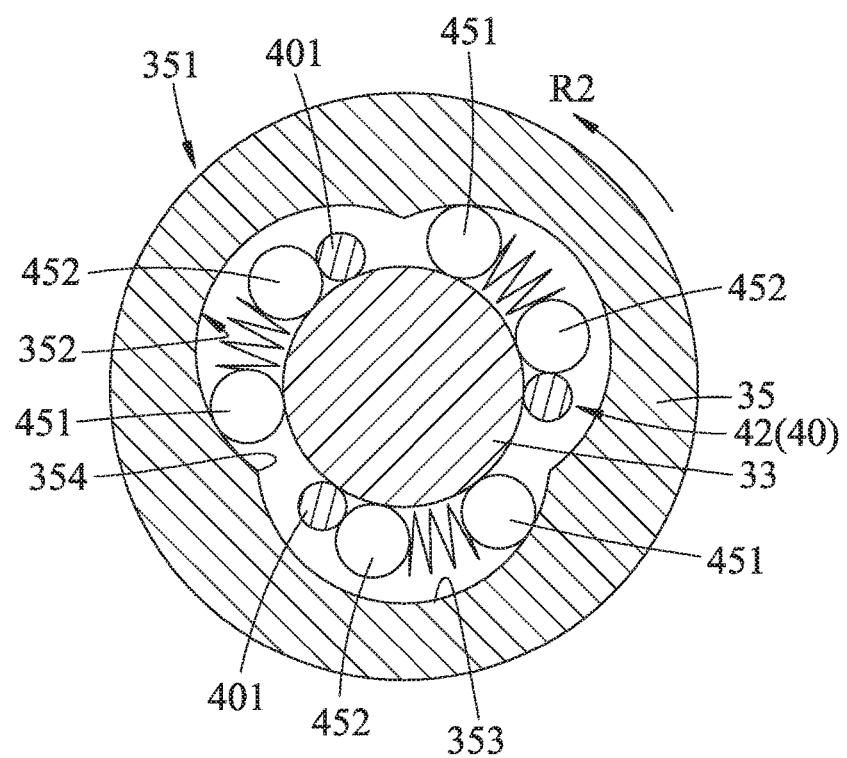
FIG. 18 is similar to FIG. 17 but illustrating a ratchet end of a ratchet member in a forward position.

As shown in FIG. 18, in response to a counterclockwise turning of the pins 401 from the normal position to the forward position, the second friction rollers 452 are respectively moved away from the ridge areas 354 against the biasing force of the biasing subunits 450 to permit the rotary ring member 35 to rotate in a counterclockwise direction (R2). In this case, as shown in FIG. 16, the input gear 35 is permitted to rotate only in a clockwise direction (R4) to thereby allow the movement of the top end 201 of the seat post 2 toward the upper position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A height adjusting device for a bicycle which includes a seat and a bicycle frame having a seat tube, said height adjusting device comprising:
   a mounting tube extending along a tube axis in an axial direction, and having an upper open end and a lower end which is configured to be inserted into the seat tube;
   a seat post which is movably engaged relative to said mounting tube, and which has
      a top end which is disposed outwardly of said mounting tube for supporting the seat, and which is displaceable between an upper position, where said top end is distal from said mounting tube, and a lower position, where said top end is proximal to said mounting tube relative to said upper position,
      a bottom end opposite to said top end in the axial direction, and
      an intermediate segment disposed between said top and bottom ends and having a plurality of engaged areas separated from each other in the axial direction; and
   an adjusting unit including a ratchet member having a ratchet end which is rotatable about a ratchet axis between: (i) a forward position; (ii) a normal position; and (iii) a rearward position, and which is coupled to a selected one of said engaged areas so as to permit said selected one of said engaged areas to remain engaged relative to said ratchet end, said ratchet end being configured such that:
      (i) when said ratchet end is in said normal position, said seat post is prevented from movement relative to said mounting tube,
      (ii) when said ratchet end is moved to said forward position from said normal position, said seat post is permitted to be unidirectionally displaced toward said upper position, and
      (iii) when said ratchet end is moved to said rearward position from said normal position, said seat post is permitted to be unidirectionally displaced toward said lower position.

2. The height adjusting device according to claim 1, wherein said mounting tube defines therein an inner tubular space, and said seat post is telescopically received in said inner tubular space through said upper open end of said mounting tube.

3. The height adjusting device according to claim 2, wherein said intermediate segment has a rack region including a plurality of rack teeth which are displaced from each other in the axial direction to serve as said engaged areas.

4. The height adjusting device according to claim 3, further comprising a biasing member disposed between said lower end of said mounting tube and said bottom end of said seat post so as to bias said top end of said seat post to move to said upper position.

5. The height adjusting device according to claim 3, further comprising a gear unit which is disposed to couple said ratchet end to said selected one of said rack teeth so as to permit said selected one of said rack teeth to be kept engaged with said gear unit.

6. The height adjusting device according to claim 5, wherein said adjusting unit further includes a biasing unit disposed to bias said ratchet end to be in frictional engagement with said gear unit so as to keep said selected one of said rack teeth to be in frictional engagement with said gear unit.

7. The height adjusting device according to claim 6, wherein said ratchet end is rotatable about the ratchet axis in a radial direction relative to the axial direction.

8. The height adjusting device according to claim 7, wherein said gear unit includes a pinion gear which is rotatably meshed with said racket teeth about a gear axis in a transverse direction relative to the axial direction.

9. The height adjusting device according to claim 8, wherein said seat post further has
an upper barrier surface which is spaced apart from an uppermost one of said rack teeth in the axial direction, and which is configured such that once said pinion gear is forced to slip over said uppermost one of said rack teeth in response to a downward movement of said seat post, said upper barrier surface is not permitted to be brought into frictional engagement with said pinion gear, thereby terminating the downward movement of said seat post, and
a lower barrier surface which is spaced apart from a lowermost one of said rack teeth in the axial direction, and which is configured such that once said pinion gear is forced to slip over said lowermost one of said rack teeth in response to an upward movement of said seat post, said lower barrier surface is not permitted to be brought into frictional engagement with said pinion gear, thereby terminating the upward movement of said seat post.

10. The height adjusting device according to claim 8, further comprising a casing mounted on said mounting tube, wherein:
said mounting tube has an access opening;
said rack region is formed on an outer surface of said seat post;
said ratchet member further has an inserted end opposite to said ratchet end in the radial direction;
said casing defines therein a chamber in which said pinion gear is rotatably mounted, said chamber extending toward said mounting tube to be in spatial communication with said access opening to permit access of said pinion gear to said rack region, said chamber further extending away from said mounting tube to terminate at a mounting wall, said mounting wall having a through hole which extends along the ratchet axis, and which has
a smaller-dimension hole segment,
a larger-dimension hole segment configured to permit insertion of said inserted end of said ratchet member, and
a shoulder surface disposed between said smaller-dimension and larger-dimension hole segments, said biasing unit being disposed between said shoulder surface and said inserted end of said ratchet member to bias said ratchet end into frictional engagement with said pinion gear; and
said adjusting unit further includes a crank member having
a shaft segment which extends from said inserted end of said ratchet member through said smaller-dimension hole segment to terminate at a connected end disposed outwardly of said mounting wall, and which is rotatably mounted in said smaller-dimension hole segment, and
an arm segment extending radially from said connected end relative to the ratchet axis, and having an actuated region which is angularly displaceable about the ratchet axis among an upward position, where said ratchet end is in said forward position, a mid position, where said ratchet end is in said normal position, and a downward position, where said ratchet end is in said rearward position.

11. The height adjusting device according to claim 10, wherein said adjusting unit further includes
an actuating lever which is coupled to said actuated region of said arm segment of said crank member so as to actuate said actuated region to move among said upward position, said mid position, and said downward position, and which has
a pivot end which is adapted to be pivotally mounted on the bicycle frame, and
an actuating end which is angularly movable among a locked position, where said actuated region is in said mid position, a rightward position, where said actuated region is in said upward position, and a leftward position, where said actuated region is in said downward position, and
a force-transmitting cable disposed to couple said pivot end of said actuating lever to said actuated region of said arm segment of said crank member.

12. The height adjusting device according to claim 8, further comprising a mounting shaft which is mounted diametrically in said mounting tube, and which extends outwardly of said mounting tube to terminate at a mounting end, said mounting shaft defining both the ratchet axis and the gear axis,
wherein:
said mounting tube has an annular slot disposed to surround said mounting shaft proximate to said mounting end;
said seat post is in the form of tubular, and has an inner peripheral surface which defines an inner space to accommodate said pinion gear, and which has said rack region, said seat post having two slots which are diametrically opposite to each other to permit said mounting shaft to extend into said inner space and to pass through said two slots, and which are configured to extend in the axial direction to permit said mounting shaft to guide movement of said seat post;
said pinion gear is rotatably mounted on said mounting shaft about the gear axis in said inner space of said seat post, and is in the form of ring, said pinion gear having
an outer rim surface formed with a plurality of gear teeth which are displaced from each other about the gear axis, and which are configured to mesh with said rack teeth, and
an inner rim surface opposite to said outer rim surface to confront said mounting shaft, and having a plurality of arcuate-recessed regions displaced from each other about the gear axis, and a plurality of ridge areas alternating with said arcuate-recessed regions;
said adjusting unit further includes a plurality of pairs of first and second friction rollers, each pair of said first and second frictional rollers being rollable on a corresponding one of said arcuate-recessed regions;
said biasing unit includes a plurality of biasing subunits each being disposed to bias a corresponding pair of said first and second friction rollers to move toward two corresponding ones of said ridge areas; and
said ratchet member has
an actuating knob which is rotatably mounted on said mounting end of said mounting shaft to rotate said ratchet end from said normal position to one of said forward and rearward positions, and which has a tube-side surface, and said ratchet end including a plurality of pins displaced from each other about the ratchet axis, each of said pins extending from said tube-side surface of said actuating knob through said annular slot into said pinion gear and between said mounting shaft and said inner rim surface, such that:

(i) when said pins are in said normal position, each of said pins is disposed between said mounting shaft and a corresponding one of said ridge areas so as to be squeezed between two adjacent ones of said first and second friction rollers;

(ii) in response to a clockwise turning of said pins from said normal position to said forward position, said first friction rollers are respectively moved away from said ridge areas against a biasing force of said biasing subunits to permit said pinion gear to rotate in a clockwise direction, thereby allowing movement of said top end of said seat post toward said upper position; and (iii) in response to a counterclockwise turning of said pins from said normal position to said rearward position, said second friction rollers are respectively moved away from said ridge areas against the biasing force of said biasing subunits to permit said pinion gear to rotate in a counterclockwise direction, thereby allowing movement of said top end of said seat post toward said lower position.

13. The height adjusting device according to claim 5, further comprising:

a casing extending in the axial direction to terminate at upper and lower end walls which defines therebetween a casing space to accommodate said gear unit, said casing having a through opening which extends between said upper and lower end walls, and which is configured to permit said mounting tube to be fitted in said through opening; and a mounting shaft which is disposed in said casing space to be spaced apart from said mounting tube, and which extends along a shaft axis in the axial direction from said lower end wall through said upper end wall to form a mounting end segment disposed outwardly of said upper end wall, wherein:

said adjusting unit further includes a rotary ring member which is configured to couple to rotate with said gear unit, and which is mounted rotatably on said mounting end segment about the shaft axis, said rotary ring member having an outer rim surface, and an inner rim surface which is opposite to said outer rim surface to confront said mounting shaft, and which has a plurality of arcuate-recessed regions displaced from each other about the shaft axis, and a plurality of ridge areas alternating with said arcuate-recessed regions, a plurality of pairs of first and second friction rollers, each pair of said first and second frictional rollers being rollable on a corresponding one of said arcuate-recessed regions, and a biasing unit including a plurality of biasing subunits each being disposed to bias a corresponding pair of said first and second friction rollers to move toward two corresponding ones of said ridge areas;

said mounting tube has an access opening;

said rack region is formed on an outer surface of said seat post;

said gear unit is disposed in said casing space to couple said rotary ring member to said selected one of said rack teeth, and includes an input gear which is disposed to access to said racket teeth through said access opening, and which is rotatably meshed with said racket teeth about a gear axis in a transverse direction relative to the axial direction, and an output gear which is rotatably mounted on said mounting shaft and which is coupled to permit said rotary ring member to rotate therewith;

said ratchet member has an actuating knob which is disposed upwardly of said rotary ring member, and which is rotatably mounted on said mounting end segment of said mounting shaft to rotate said ratchet end from said normal position to one of said forward and rearward positions, said actuating knob having a casing-side surface, and said ratchet end having a plurality of pins displaced from each other about the shaft axis, each of said pins extending from said casing-side surface of said actuating knob into said rotary ring member and between said mounting shaft and said inner rim surface, such that:

(i) when said pins are in said normal position, each of said pins is disposed between said mounting shaft and a corresponding one of said ridge areas so as to be squeezed between two adjacent ones of said first and second friction rollers;

(ii) in response to a clockwise turning of said pins from said normal position to said rearward position, said first friction rollers are respectively moved away from said ridge areas against a biasing force of said biasing subunits to permit said rotary ring member to rotate in a clockwise direction, thereby allowing movement of said top end of said seat post toward said lower position; and (iii) in response to a counterclockwise turning of said pins from said normal position to said forward position, said second friction rollers are respectively moved away from said ridge areas against the biasing force of said biasing subunits to permit said rotary ring member to rotate in a counterclockwise direction, thereby allowing movement of said top end of said seat post toward said upper position.

14. The height adjusting device according to claim 3, further comprising a casing mounted on said mounting tube, wherein:

said mounting tube has an access opening;

said ratchet end is rotatable about the ratchet axis in a radial direction relative to the axial direction, said ratchet member further having an inserted end opposite to said ratchet end in the radial direction;

said casing defines therein a chamber in which said ratchet member is rotatably mounted, said chamber extending toward said mounting tube to be in spatial communication with said access opening to permit access of said ratchet end to said rack region, said chamber further extending away from said mounting tube to terminate at a mounting wall, said mounting wall having a through hole which extends along the ratchet axis, and which has a smaller-dimension hole segment, a larger-dimension hole segment configured to permit insertion of said inserted end of said ratchet member, and a shoulder surface disposed between said smaller-dimension and larger-dimension hole segments; and said adjusting unit further includes a biasing unit disposed between said shoulder surface and said inserted end of said ratchet member to bias said ratchet end into frictional engagement with said rack region, and a crank member having a shaft segment which extends from said inserted end of said ratchet member through said smaller-dimension hole segment to terminate at a connected end disposed outwardly of said mounting wall, and which is rotatably mounted in said smaller-dimension hole segment, and an arm segment extending radially from said connected end relative to the ratchet axis, and having an actuated region which is angularly displaceable about the ratchet axis among an upward position, where said ratchet end is in said forward position, a mid position, where said ratchet end is in said normal position, and a downward position, where said ratchet end is in said rearward position.

* * * * *